United States Patent
Rotondi

Patent Number: 5,619,954
Date of Patent: Apr. 15, 1997

[54] SELF PROJECTING PET TOY

[76] Inventor: Paul A. Rotondi, P.O. Box 299, Commack, N.Y. 11725

[21] Appl. No.: 537,620

[22] Filed: Oct. 2, 1995

[51] Int. Cl.$^6$ ................................................. A01K 29/00
[52] U.S. Cl. ............................................ 119/707; 119/709
[58] Field of Search ................................. 119/702, 707, 119/709, 711, 710; 446/236, 220, 491, 409, 431

[56] References Cited

U.S. PATENT DOCUMENTS

| | | | |
|---|---|---|---|
| 2,230,138 | 1/1941 | Ewart | 446/220 |
| 3,073,058 | 1/1963 | Lemelson | 446/220 X |
| 4,232,477 | 11/1980 | Lin | 446/71 |
| 5,191,856 | 3/1993 | Gordon | 119/29.5 |
| 5,265,559 | 11/1993 | Borell | 119/707 |
| 5,339,771 | 8/1994 | Axelrod | 119/710 |

*Primary Examiner*—Robert P. Swiatek
*Assistant Examiner*—Yvonne R. Abbott
*Attorney, Agent, or Firm*—Richard L. Miller, P.E.

[57] ABSTRACT

A self projecting pet toy that allows a pet to play therewith without sinking its teeth therein. The self projecting pet toy includes a hollow cylindrically-shaped body portion, a pair of hollow first collar portions, a pair of hollow second collar portions, and a pair of hollow end cap hemispherical shaped portions. The hollow substantially cylindrically-shaped body portion has a pair of open body portion ends. Each of the pair of hollow first collar portions have an open first collar portion first end disposed at and integrally formed with each of the pair of open body portion ends and communicates smoothly therewith. Each of the pair of hollow first collar portions has an open first collar portion second end disposed a distance from each open first collar portion first end and curves inwardly therefrom in a convex arc. Each of the pair of hollow second collar portions have an open second collar portion first end disposed at and integrally formed with each open first collar portion second end and communicates smoothly therewith. Each of the pair of hollow second collar portions have an open second collar portion second end disposed a distance from each open second collar portion first end and curves inward therefrom in a concave arc. Each of the pair of hollow end cap hemispherical shaped portions have an open end cap base disposed at and integrally formed with each open second collar portion second end and communicates smoothly therewith.

5 Claims, 1 Drawing Sheet

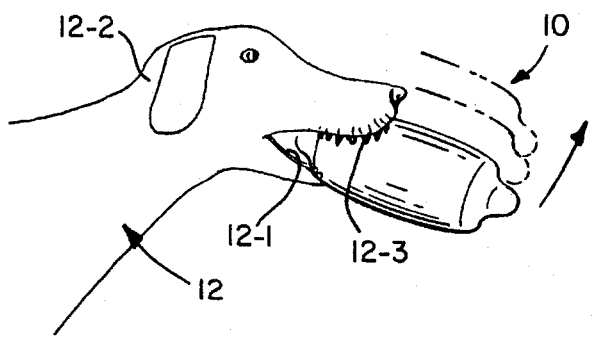
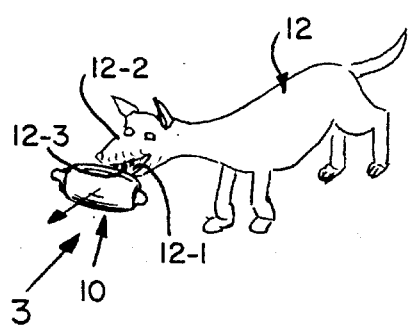
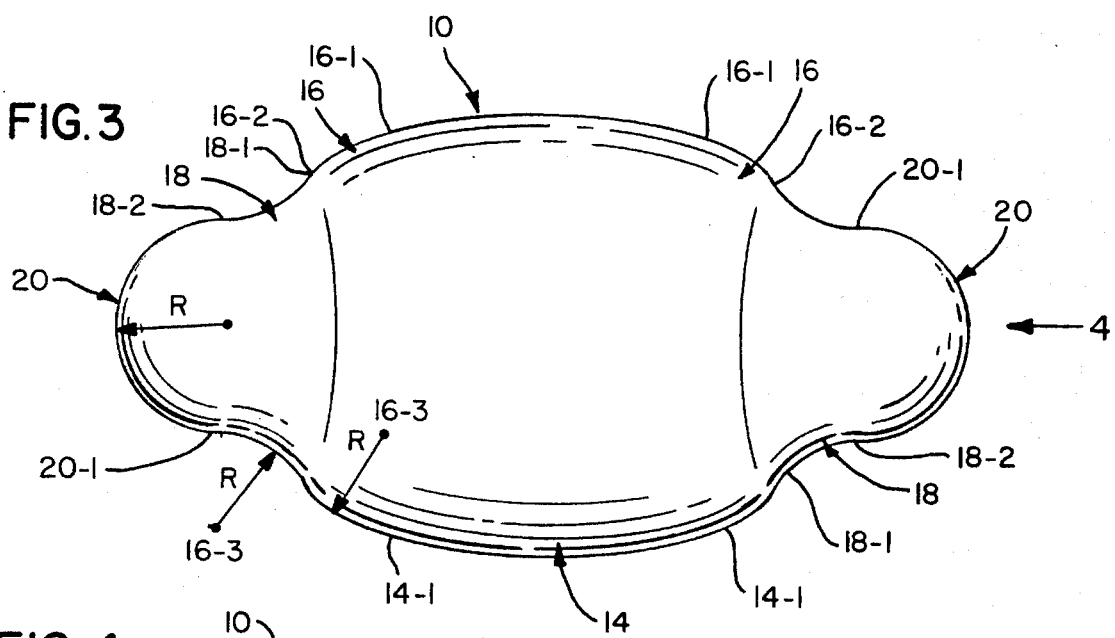
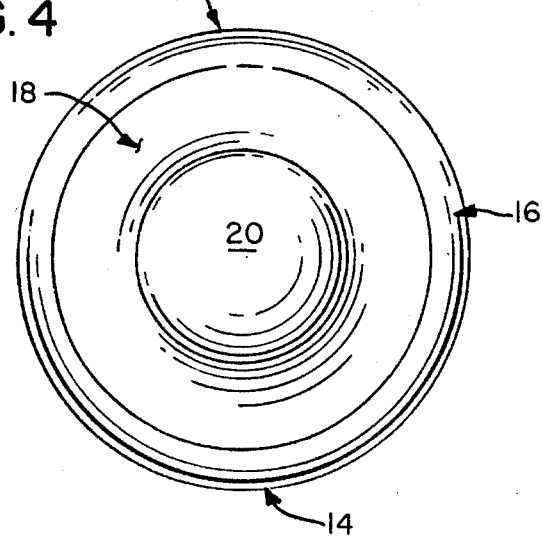

SELF PROJECTING PET TOY

CROSS REFERENCES TO RELATED APPLICATIONS

This application contains subject matter disclosed in applicant's Disclosure Document No. 371212 filed on Feb. 27, 1995. As such, it is respectfully requested that the disclosure document be relied upon and remain a permanent part of the file history during the prosecution of the instant application and during any subsequent action thereof.

BACKGROUND OF THE INVENTION

The present invention relates to a pet toy. More particularly, the present invention relates to a pet toy that includes a hollow cylindrically-shaped body portion, a hollow first collar convex arcuate shaped portions integrally formed at a first end to each end of the hollow cylindrically-shaped body portion, a hollow second collar concave arcuate shaped portion integrally formed at a first end to a second end of each hollow first collar convex arcuate shaped portion, and a hollow end cap hemispherical shaped portion integrally formed to each second end of each hollow second collar convex arcuate shaped portion.

Pet owners have previously used several varieties of toys for entertainment and pet training. In particular, owners of dogs and cats have used pet toys for entertainment and training. Balls have been used for throwing and retrieving. A variety of actual and simulated bones have also been used as retrieving toys for pets. However, these and other pet toys have not provided a high degree of visual activity which accentuates the attractiveness of the toy to the pet.

There is also a continuing need for pet toys which provide a higher level of pet interest. This is particularly true for pet trainers interested in developing greater pet skills and intelligence in a shorter time frame. Many prior art pet toys prove interesting for only limited periods of time and thus do not maintain interest and limit the effectiveness of the toy as an educational and skills training tool.

Numerous innovations for pet toys have been provided in the prior art that will be described. However, even though these innovations may be suitable for the specific individual purposes to which they address, they differ from the present invention in that they do not teach a pet toy that includes a hollow cylindrically-shaped body portion, a hollow first collar convex arcuate shaped portions integrally formed at a first end to each end of the hollow cylindrically-shaped body portion, a hollow second collar concave arcuate shaped portion integrally formed at a first end to a second end of each hollow first collar convex arcuate shaped portion, and a hollow end cap hemispherical shaped portion integrally formed to each second end of each hollow second collar convex arcuate shaped portion.

For example, U.S. Pat. No. 5,191,856 to Gordon teaches an animal toy that includes a tube, releasably closed at both ends, closing means placed under tension by a spring located in the tube, and a material disposed in the interior.

Another example, U.S. Pat. No. 5,265,559 to Borell teaches a pet toy and training apparatus that includes a ball portion, a tail hold connected to the ball portion, and a flexible tail secured to the tail hold.

Finally, still another example, U.S. Pat. No. 5,339,771 to Axelrod teaches a chew toy for pets which is made from a molded synthetic thermoplastic and has animal dispersed therein.

It is apparent that numerous innovations for pet toys have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a self projecting pet toy that avoids the disadvantages of the prior art.

Another object of the present invention is to provide a self projecting pet toy that is simple and inexpensive to manufacture.

Still another object of the present invention is to provide a self projecting pet toy that is simple to use.

Yet another object of the present invention is to provide a self projecting pet toy that allows a pet to play therewith but not to sink its teeth therein.

Briefly stated, still yet another object of the present invention is to provide a self projecting pet toy that includes a hollow cylindrically-shaped body portion, a pair of hollow first collar portions, a pair of hollow second collar portions, and a pair of hollow end cap hemispherical shaped portions.

Yet still another object of the present invention is to provide a self projecting pet toy wherein the hollow substantially cylindrically-shaped body portion has a pair of completely open body portion ends.

Still yet another object of the present invention is to provide a self projecting pet toy wherein each of the pair of hollow first collar arcuate shaped portions has a completely open first collar portion first end disposed at and integrally formed with each of the pair of completely open body portion ends and communicating smoothly therewith.

Yet still another object of the present invention is to provide a self projecting pet toy wherein each of the pair of hollow first collar arcuate shaped portions has a completely open first collar portion second end disposed a distance from each completely open first collar portion first end and curving inwardly therefrom in a convex arc having a radius.

Still yet another object of the present invention is to provide a self projecting pet toy wherein each of the pair of hollow second collar arcuate shaped portions has a completely open second collar portion first end disposed at and integrally formed with each completely open first collar portion second end and communicating smoothly therewith.

Yet still another object of the present invention is to provide a self projecting pet toy wherein each of the pair of hollow second collar arcuate shaped portions has a completely open second collar portion second end disposed a distance from each completely open second collar portion first end and curving inward therefrom in a concave arc having a radius.

Still yet another object of the present invention is to provide a self projecting pet toy wherein each of the pair of hollow end cap hemispherical shaped portions has a completely open end cap base disposed at and integrally formed with each completely open second collar portion second end and communicating smoothly therewith.

Yet still another object of the present invention is to provide a self projecting pet toy wherein each of the each of the pair of hollow end cap hemispherical shaped portions has a radius.

5,619,954

Still yet another object of the present invention is to provide a self projecting pet toy wherein the radius of the pair of hollow first collar arcuate shaped portions, the radius of the pair of hollow second collar arcuate shaped portions, and the radius of the pair of hollow end cap hemispherical shaped portions are equal.

Yet still another object of the present invention is to provide a self projecting pet toy wherein the integrally formed hollow substantially cylindrically-shaped body portion, the pair of hollow first collar arcuate shaped portions, the pair of hollow second collar arcuate shaped portions, and the pair of hollow end cap hemispherical shaped portions are manufactured from plastic.

Still yet another object of the present invention is to provide a self projecting pet toy wherein the plastic is molded thermoplastic.

Yet still another object of the present invention is to provide a self projecting pet toy wherein the molded thermoplastic is acetate.

Still yet another object of the present invention is to provide a self projecting pet toy wherein the self projecting pet toy has a length in the range of 3" to 6½".

Yet still another object of the present invention is to provide a self projecting pet toy that further includes a pressurized gas.

Still yet another object of the present invention is to provide a self projecting pet toy wherein the pressurized gas is selected from a group consisting of air and inert gas.

Finally, yet still another object of the present invention is to provide a self projecting pet toy wherein the pressurized gas is in the range of 2 psi. to 50 psi.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view illustrating a pet playing with the present invention and trying to get a good grasp on the instant invention with his teeth;

FIG. 2 is a diagrammatic perspective view illustrating a pet not being able to get a grasp on the present invention;

FIG. 3 is a diagrammatic side elevational view of the instant invention per se taken in the direction of arrow 3 in FIG. 2; and FIG. 4 is a diagrammatic end view thereof taken in the direction of arrow 4 in FIG. 3.

LIST OF REFERENCE NUMERALS UTILIZED IN THE DRAWING

10: self projecting pet toy of the present invention
12: dog
12-1: mouth
12-2: head
12-3: teeth
14: hollow substantially cylindrically-shaped body portion
14-1: pair of completely open body portion ends
16: pair of hollow first collar arcuate shaped portions
16-1: completely open first collar portion first end
16-2: completely open first collar portion second end
16-3: radius
18: pair of hollow second collar arcuate shaped portions
18-1: completely open second collar portion first end
18-2: completely open second collar portion second end
20: pair of hollow end cap hemispherical shaped portions
20-1: completely open end cap base

DETAILED DESCRIPTION OF THE PREFERRED EMBODIMENT

Referring now to the figures in which like numerals indicate like parts, and particularly to FIGS. 1 and 2, the self projecting pet toy of the present invention is shown generally at 10 positioned in the mouth 12-1 of the head 12-2 of a dog 12.

As shown in FIG. 1, the dog 12 is playing with the self projecting pet toy 10 by shaking his head 12-1 and trying to get a good grasp thereon with his teeth 12-3.

As shown in FIG. 2, the dog 12 in not able to get a good grasp on the self projecting pet toy 10 with his teeth 12-3 and therefore dropping it.

It is to be understood that the self projecting pet toy 10 can be used by dogs, cats, and any other animal with teeth. The self projecting pet toy 10 has a smooth surface, is one piece, is molded from synthetic thermoplastic acetate, and may be provided in a small size having a length in the range of 3" to 3½", in a medium size having a length of 5", and in a large size having a length in the range of 6" to 6½".

The self projecting pet toy 10 is hollow and contains pressurized air or inert gas in the range of 2 psi. to 50 psi.

The self projecting pet toy 10 allows the dog 12 to play with it without the threat of damage from the teeth 12-3 of dog 12. Due to the smooth surface of the acetate, the teeth 12-3 of the dog 12 can not grab the self projecting pet toy 10, and due to the criticality of the dimensions of the self projecting pet toy 10, the dog 12 can not get his mouth 12-1 around it to provide sufficient grabbing.

The configuration of the self projecting pet toy 10 can best be seen in FIGS. 3 and 4, and as such, will be discussed with reference thereto.

The self projecting pet toy 10 includes a hollow substantially cylindrically-shaped body portion 14 with a pair of completely open body portion ends 14-1. A pair of hollow first collar arcuate shaped portions 16, each of which has a completely open first collar portion first end 16-1 is disposed at and integrally formed with each of the pair of completely open body portion ends 14-1 and communicates smoothly therewith.

Each of the pair of hollow first collar arcuate shaped portions 16 has a completely open first collar portion second end 16-2 disposed a distance from each completely open first collar portion first end 16-1 and curves inward therefrom in a convex arc having a radius 16-3.

A pair of hollow second collar arcuate shaped portions 18, each of which has a completely open second collar portion first end 18-1 is disposed at and integrally formed with each completely open first collar portion second end 16-2 and communicates smoothly therewith.

Each of the pair of hollow second collar arcuate shaped portions 18 has a completely open second collar portion second end 18-2 disposed a distance from each completely open second collar portion first end 18-1 and curves inward therefrom in a concave arc also having the radius 16-3.

A pair of hollow end cap hemispherical shaped portions 20, each of which has a completely open end cap base 20-1 is disposed at and integrally formed with each completely open second collar portion second end 18-2 and communicates smoothly therewith.

Each of the pair of hollow end cap hemispherical shaped portions 20 also have the radius 16-3.

It will be understood that each of the elements described above, or two or more together, may also find a useful application in other types of constructions differing from the types described above.

While the invention has been illustrated and described as embodied in a self projecting pet toy, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A self projecting pet toy that cannot be grabbed in a mouth of a pet while allowing the pet to play therewith without damage thereto from teeth of the pet, comprising:

a) a hollow and barrel-shaped body portion having a barrel shape and a pair of body portion ends;

b) a pair of hollow first collar arcuate shaped portions, each of which having a first collar portion first end disposed at, and integrally formed with, each of said pair of body portion ends and communicating smoothly therewith; each of said pair of hollow first collar arcuate shaped portions further having a first collar portion second end disposed a distance from each said first collar portion first end and curving inwardly therefrom in a convex arc having a radius;

c) a pair of hollow second collar arcuate shaped portions, each of which having a second collar portion first end disposed at, and integrally formed with, each said first collar portion second end of and communicating smoothly therewith; each of said pair of hollow second collar arcuate shaped portions further having a second collar portion second end disposed a distance from each said second collar portion first end and curving inward therefrom in a concave arc having a radius; and d) a pair of hollow end cap hemispherical shaped and closed portions being closed, each of which having an end cap base disposed at, and integrally formed with, each said second collar portion second end and communicating smoothly therewith; each of said pair of hollow end cap hemispherical shaped and closed portions further having a radius; said radius of said pair of hollow first collar arcuate shaped portions, said radius of said pair of hollow second collar arcuate shaped portions, and said radius of said pair of hollow end cap hemispherical shaped and closed portions being equal; said hollow and barrel-shaped body portion, said pair of hollow first collar arcuate shaped portions, said pair of hollow second collar arcuate shaped portions, and said pair of hollow end cap hemispherical shaped and closed portions being thermoplastic which is inherently hard and non-pliable unless heated; said thermoplastic being acetate so as to form a smooth surface; said equal radii of said pair of hollow first collar arcuate shaped portions, and said pair of hollow second collar arcuate shaped portions, and said pair of hollow end cap hemispherical shaped and closed portions together with said barrel shape of said hollow and barrel-shaped body portion providing a shape that prevents said self projecting pet toy from being grabbed in the mouth of the pet while said acetate thermoplastic allows the pet to play with said self projecting pet toy without damage thereto from the teeth of the pet as a result of said smooth surface formed by said acetate and said thermoplastic being hard and non-pliable unless heated preventing the teeth of the pet from grabbing said self projecting pet toy.

2. The toy as defined in claim 1, wherein said self projecting pet toy has a length in the range of 3" to 6½".

3. The toy as defined in claim 1; further comprising a pressurized gas.

4. The toy as defined in claim 3, wherein said pressurized gas is selected from a group consisting of air and inert gas.

5. The toy as defined in claim 3, wherein said pressurized gas is in the range of 2 psi. to 50 psi.

* * * * *